Patented Sept. 5, 1933

1,925,795

UNITED STATES PATENT OFFICE 1,925,795

PERMANENTLY NEUTRAL FORMALDEHYDE AND METHOD OF PRODUCING SAME

Melville C. Dearing, Palatine, Ill., assignor to Economy Fuse and Manufacturing Company, Chicago, Ill., a corporation of New York No Drawing. Application September 6, 1932 Serial No. 631,896

2 Claims. (Cl. 23—250)

This invention relates to a process by which permanently neutral solutions of formaldehyde may be produced.

Formaldehyde of commerce which usually consists of a 40% aqueous solution is almost invariably acid. The acid constituent is formic acid which may be formed during the oxidation of methyl alcohol to formaldehyde or as the result of air oxidation of the formaldehyde at a stage subsequent to its synthesis.

Numerous commercial formaldehyde solutions examined have been found to contain from 5/100 to 15/100 of 1% of formic acid by weight. The hydrogen ion concentration of such solutions varies from $1 \times 10^{-2.8}$ to $1 \times 10^{-3.2}$.

It is, of course, easy to exactly neutralize these solutions by the addition of suitable quantities of alkalies such as caustic soda, sodium carbonate and the like. However, such neutralized solutions do not remain neutral when exposed to air. Furthermore, even an excess of alkali such as caustic soda does not form a permanently alkaline solution since a reaction between the formaldehyde occurs whereby an alkali metal formate and methyl alcohol are formed.

Exactly neutral formaldehyde solutions are of importance in certain syntheses. For example, dimethylol urea is formed by the interaction of urea and formaldehyde in exactly neutral solutions. The presence of either alkali or acid results in the formation of large amounts of by-product.

Similarly the hydrogen ion concentration of the formaldehyde solution plays an important part in determining the character of other reaction products of urea and formaldehyde.

Accordingly, it is an object of the present invention to provide a process by which permanently neutral solutions of formaldehyde may be produced.

It has now been found that by the addition of basic magnesium carbonate to formaldehyde solutions an almost exactly neutral solution can be obtained. This solution, for precise reasons unknown at present, has the property of remaining neutral over long periods of time. It may be reacted with urea without changing its hydrogen ion concentration.

This is not true of solutions neutralized or made slightly alkaline with some other reagents. For example, if a formaldehyde solution is made alkaline to phenolphthalein (hydrogen ion concentration $1 \times 10^{-8.4}$) by means of ammonia, and the solution is refluxed with neutral urea, the hydrogen ion concentration will change in a short time to $1 \times 10^{-3}$. The same phenomenon is observed when caustic soda is used as the alkali. Such a change does not occur when formaldehyde is neutralized with basic magnesium carbonate, in accordance with this invention.

In order to obtain a permanently neutral solution, it is only necessary to add to the commercial acid reacting formaldehyde a quantity of basic magnesium carbonate. Agitation or stirring may be used to effect intimate mixture. An excess of the salt does no harm. After neutralization the solution may be freed from the carbonate by filtration, decantation or other suitable means. Fifteen grams of hydrated basic magnesium carbonate is ample to neutralize six hundred grams of commercial formaldehyde solution. The excess may of course be used again. The use of a larger quantity does not change the hydrogen ion concentration which is found to be $1 \times 10^{-7.1}$. This is, for all practical purposes, neutral.

Certain other carbonates do not react in a similar manner. The following table shows the hydrogen ion concentration obtained by adding to commercial formaldehyde solutions certain carbonates and oxides:

| Formaldehyde grams | Alkali | Grams alkali | Hydrogen ion concentration of solution |
|---|---|---|---|
| 600 | Basic magnesium carbonate | 15 | $1 \times 10^{-7.1}$ |
| 108 | Magnesium oxide | 10 | $1 \times 10^{-8.3}$ |
| 108 | Barium carbonate | 20 | $1 \times 10^{-5.5}$ |
| 108 | Calcium carbonate | 15 | $1 \times 10^{-5.7}$ |

I claim:
1. The process which comprises treating a commercial solution of formaldehyde with basic magnesium carbonate.
2. The process which comprises treating a commercial formaldehyde solution with basic magnesium carbonate to produce a solution having a hydrogen ion concentration of approximately $1 \times 10^{-7.1}$.

MELVILLE C. DEARING.